United States Patent
Depondt et al.

(10) Patent No.: US 11,958,445 B2
(45) Date of Patent: Apr. 16, 2024

(54) WIPER BLADE, IN PARTICULAR FOR A MOTOR VEHICLE

(71) Applicant: Robert Bosch GmbH, Stuttgart (DE)

(72) Inventors: Helmut Depondt, Boutersem (BE); Kris Smets, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/993,138

(22) Filed: Nov. 23, 2022

(65) Prior Publication Data
US 2023/0159003 A1    May 25, 2023

(30) Foreign Application Priority Data
Nov. 23, 2021  (DE) .................... 10 2021 213 153.0

(51) Int. Cl.
*B60S 1/52*  (2006.01)
*B60S 1/38*  (2006.01)

(52) U.S. Cl.
CPC .............. *B60S 1/524* (2013.01); *B60S 1/381* (2013.01); *B60S 1/3886* (2013.01); *B60S 1/3887* (2013.01); *B60S 1/3894* (2013.01)

(58) Field of Classification Search
CPC ...... B60S 1/524; B60S 1/3886; B60S 1/3887; B60S 1/3889; B60S 1/3415; B60S 1/381; B60S 1/3891; B60S 1/3893; B60S 1/3894; B60S 1/3896
USPC .......... 15/250.04, 250.201, 250.43, 250.452, 15/250.453, 250.454
See application file for complete search history.

(56) References Cited

U.S. PATENT DOCUMENTS

| | | | |
|---|---|---|---|
| 2015/0040337 A1* | 2/2015 | Espinasse | F16B 2/18 15/250.361 |
| 2022/0001839 A1* | 1/2022 | Caillot | B60S 1/3887 |

FOREIGN PATENT DOCUMENTS

| | | | |
|---|---|---|---|
| DE | 10000373 | * | 8/2001 |
| DE | 102012100777 | * | 8/2013 |
| DE | 102017223526 | * | 6/2019 |
| WO | 2009/033885 | * | 3/2009 |
| WO | 2020/064445 | * | 4/2020 |
| WO | 2020/136115 | * | 7/2020 |

OTHER PUBLICATIONS

Machine language translation of description portion of German publication 10000373, published Aug. 2001. (Year: 2001).*
Machine language translation of description portion of German publication 102017223526, published Jun. 2019. (Year: 2019).*

* cited by examiner

*Primary Examiner* — Gary K. Graham
(74) *Attorney, Agent, or Firm* — Michael Best & Friedrich LLP

(57) ABSTRACT

A wiper blade (10), in particular for a motor vehicle, is disclosed. This comprises a wiper strip (12), a fluid channel (28), which has a channel diameter (DK), for conducting a cleaning liquid, and an end cap (18). According to the invention, the end cap (18) has a blocking plug (30) that has a blocking diameter (DB) which is smaller than the channel diameter (DK).

11 Claims, 4 Drawing Sheets

WIPER BLADE, IN PARTICULAR FOR A MOTOR VEHICLE

BACKGROUND

The invention relates to a wiper blade according to the preamble of the independent claims. Some wiper blades which have a wiper strip, a fluid channel, which has a channel diameter, for conducting a cleaning liquid, and an end cap are already known. In this case, the end cap has a closure plug which closes the fluid channel.

SUMMARY

The wiper blade according to the invention, which wiper blade has the features of the main claim, has the advantage that the end cap comprises a blocking plug that has a blocking diameter which is smaller than the channel diameter.

This results in greater reliability and a longer service life of the wiper blade.

Advantageous developments of and improvements to the features indicated in the main claim are also found in the measures described in the dependent claims.

It is particularly advantageous if a closure element is provided in the fluid channel since the closure element is hereby protected.

It is particularly advantageous here if the closure element has a diameter which is greater than the channel diameter. The closure element is thus securely held in the fluid channel.

In this case, it is particularly advantageous if the closure element is in the form of a ball, in particular a steel ball, since a ball can easily be inserted into the fluid channel and a steel ball is robust against effects resulting from the liquid located in the fluid channel.

Furthermore, it should be considered advantageous if the wiper strip comprises a wiper lip and a wind deflector and the fluid channel is arranged in the wind deflector. This is simple and cost-effective to manufacture.

In a simple, cost-effective and therefore advantageous embodiment, the wiper strip comprises a spring bar and the end cap is fastened to the spring bar, in particular by a latching connection.

The blocking plug is formed integrally with the end cap in a likewise simple and cost-effective manner.

It is particularly advantageous if the end cap is designed to be nozzle-free since it is thereby simple and cost-effective to manufacture.

BRIEF DESCRIPTION OF THE DRAWINGS

An embodiment of the invention is shown in the drawings and explained in more detail in the following description. In the drawings.

DETAILED DESCRIPTION

Figure 1:
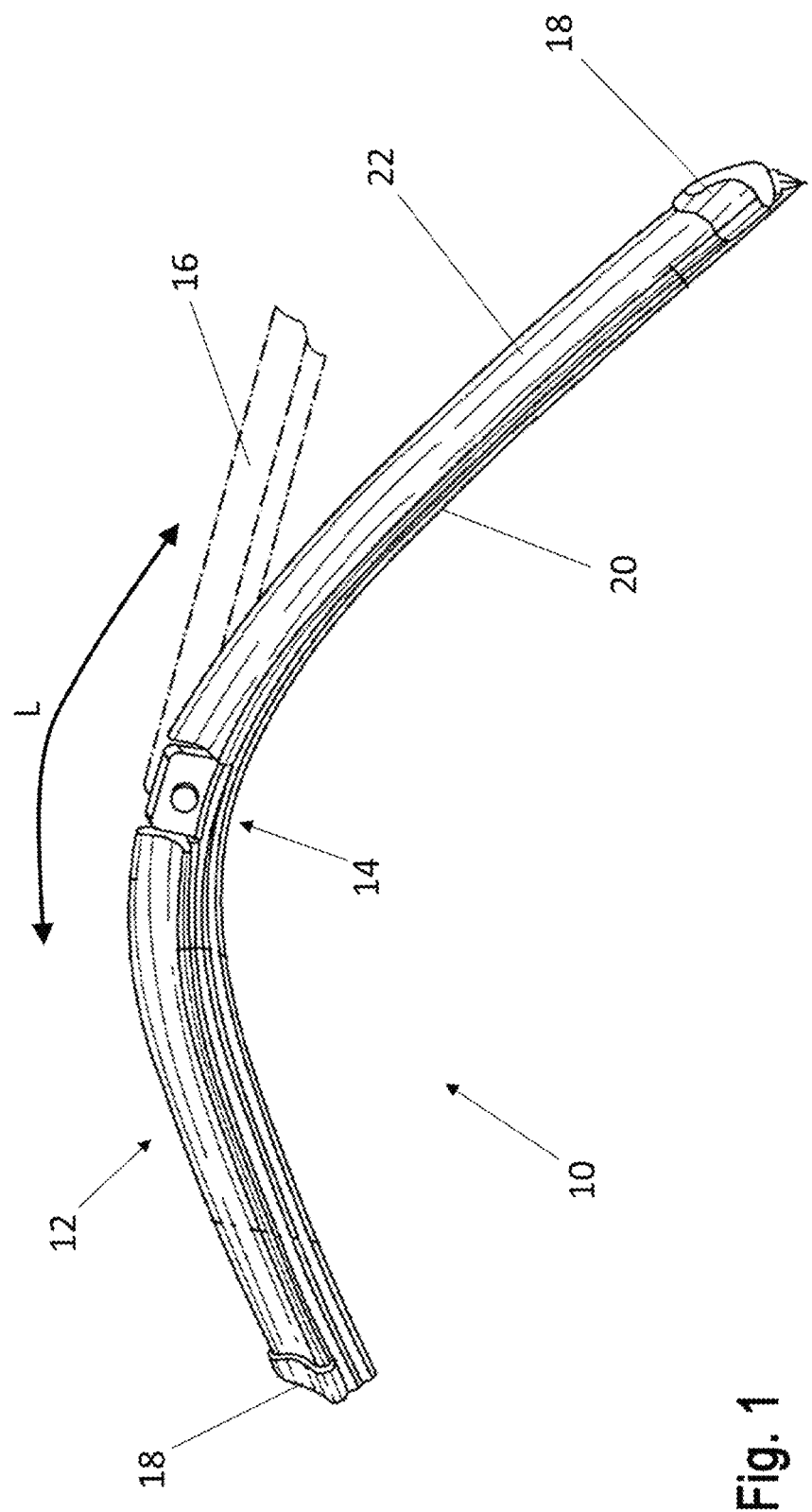
FIG. 1 is a schematic perspective view of a wiper blade according to the invention.

FIG. 1 is a schematic perspective view of a wiper blade 10 according to the invention. This comprises a wiper strip 12, which is fastened by means of a fastening means 14 to a wiper arm 16 that does not belong to the invention. In this case, the fastening means 14 has fluid connection means in order to introduce a cleaning liquid into the wiper strip 12 from the wiper arm 16.

The wiper blade 10 has a longitudinal extension L (double-arrow). An end cap 18 is arranged at each of the ends with respect to the longitudinal extension L of the wiper blade 10. The wiper strip 12 comprises a wiper lip 20 and a wind deflector 22. In the interior of the wiper strip 12, a spring bar 24 (FIG. 2) is arranged which consists of an elongated, pre-bent strip steel. The bending of this strip steel is selected in such a way that the wiper blade 10 is securely supported along its entire longitudinal extension L in the mounted position on a pane (not shown here) of a motor vehicle so that the wiper lip 20 can slide over the pane and can wipe moisture away from it.

Figure 2:
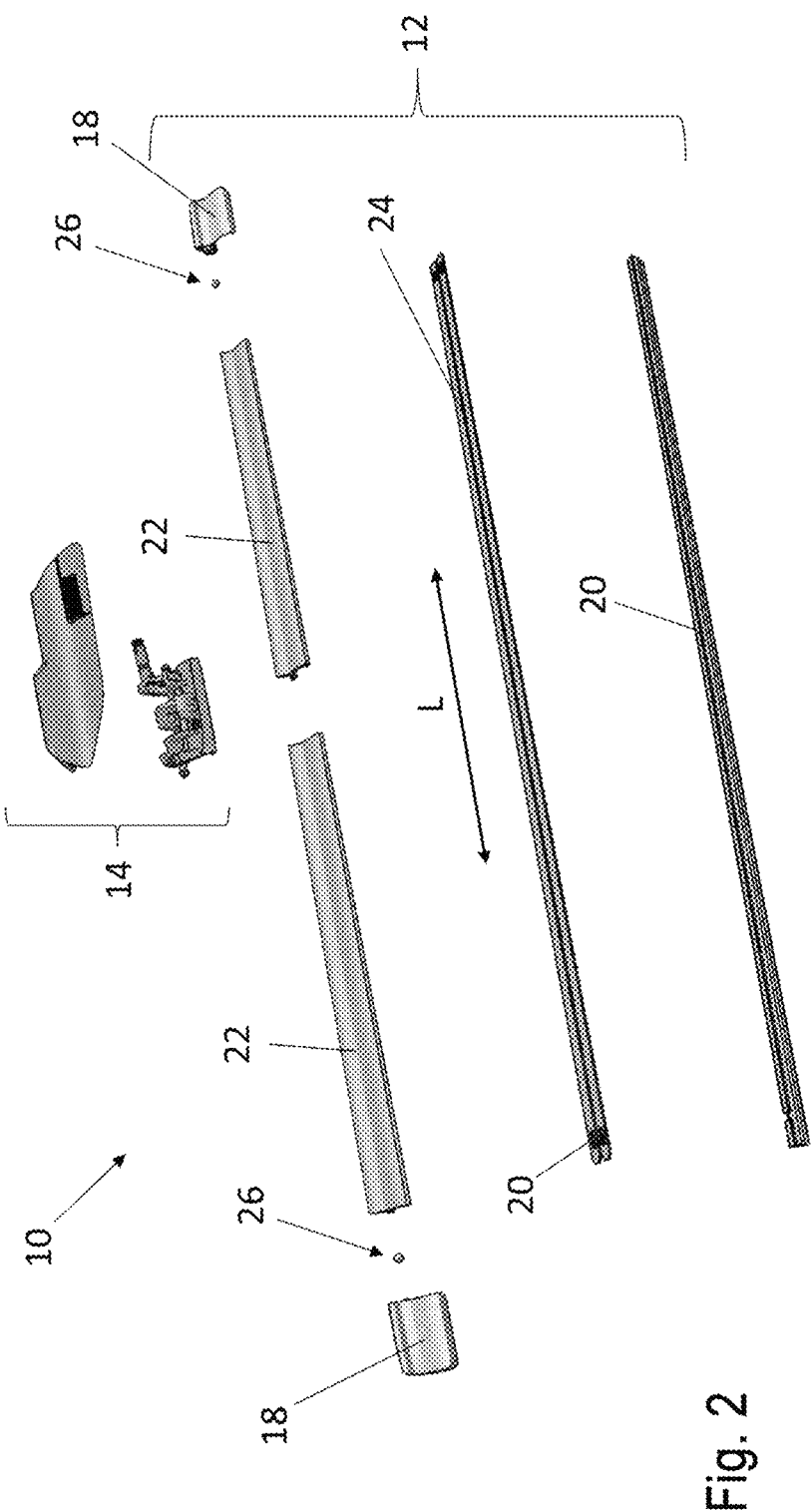
FIG. 2 is an exploded view of a wiper blade according to the invention.

FIG. 2 is a schematic exploded view of a wiper blade 10 according to the invention. The wiper lip 20 is in the form of an elongated rubber element and is held between two parts of the spring bar 24. The wind deflector 22 is arranged and fastened on the side of the spring bar 24 facing away from the wiper lip 20. The fastening element 14, which fastens the wiper blade 10 to the wiper arm 16, is arranged approximately centrally along the longitudinal extension L on the spring bar 24. An end cap 18 is arranged at each of the ends with respect to the longitudinal extension L. Furthermore, a closure element 26 is provided in the region of the end cap 18. Here, a closure element 26 is provided at each end with respect to the longitudinal extension, thus two closure elements 26 are provided. The closure element 26 is in the form of a steel ball.

Figure 3:
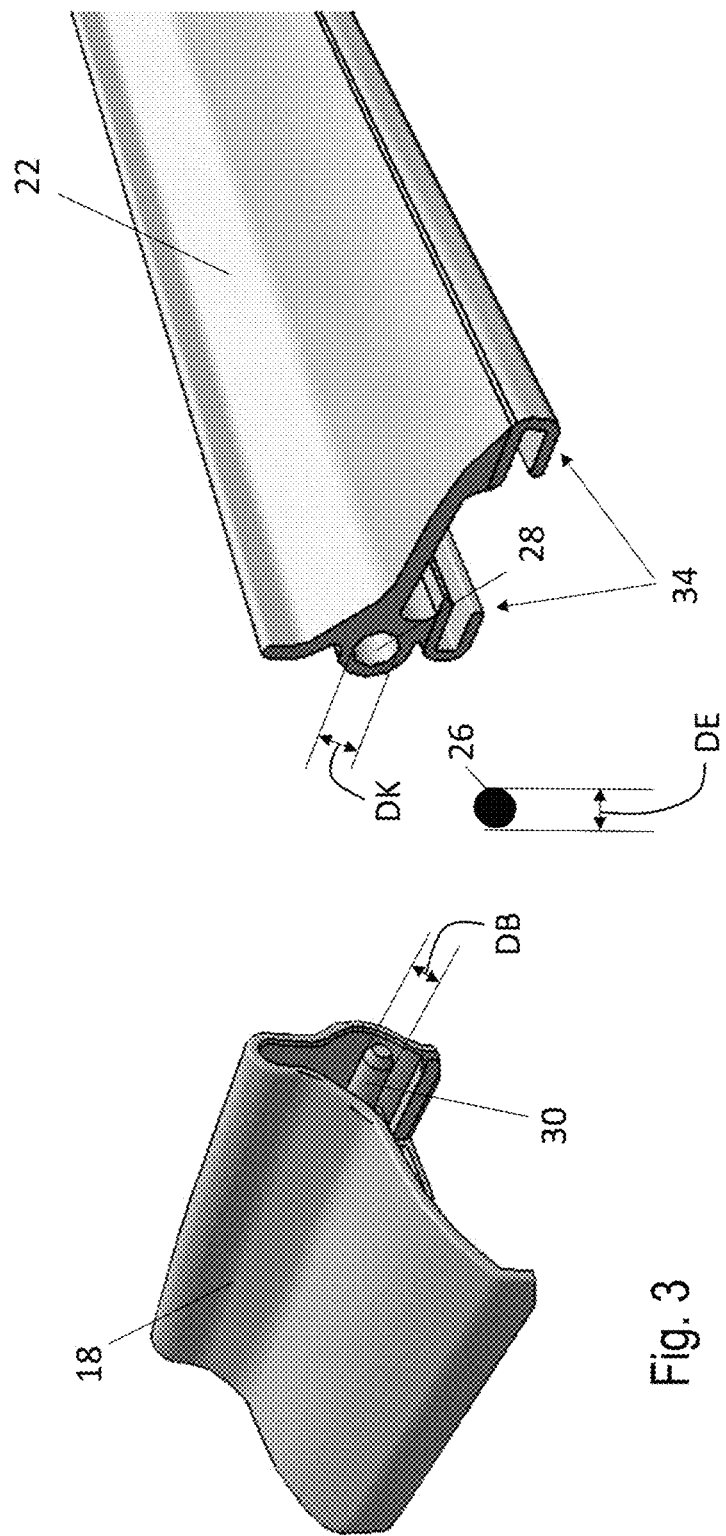
FIG. 3 is an end of a wiper blade according to the invention before the final assembly and FIG. 4 is a partial section through one end of a wiper blade according to the invention.

FIG. 3 is a detailed view of an end of a wind deflector 22 and an end cap 18. The wind deflector 22 has a fluid channel 28 which extends in the longitudinal direction L. Cleaning liquid can be transported through the fluid channel 28 during operation. The fluid channel 28 has a channel diameter DK which is approximately 3 mm. The closure element 26, which has a diameter DE that is slightly larger than the channel diameter DK, is inserted into the fluid channel 28 so that the closure element 26 is securely held in the fluid channel 28. The end cap 18 has a blocking plug 30 which is in the shape of a needle or cylinder and has a blocking diameter DB which is smaller than the channel diameter DK. The closure element 26 is inserted into the fluid channel 28 far enough that the insertion of the blocking plug 30 into the fluid channel 28 is not hindered. The end cap 18 can therefore be easily mounted. If the pressure of the cleaning liquid in the fluid channel 28 is incorrectly increased, the closure element 26 may possibly be displaced within the fluid channel 28 towards the end cap 18. If this happens, the blocking plug 30 of the end cap 18 blocks the closure element 26 from escaping from the fluid channel 28. At least one latching opening 32 (FIG. 2) is provided on the spring bar 24 for fastening the end cap 18. The latching lugs (not drawn here for reasons of clarity), arranged on the end cap 18, engage in this latching opening 32 so that a latching connection is produced.

Figure 4:
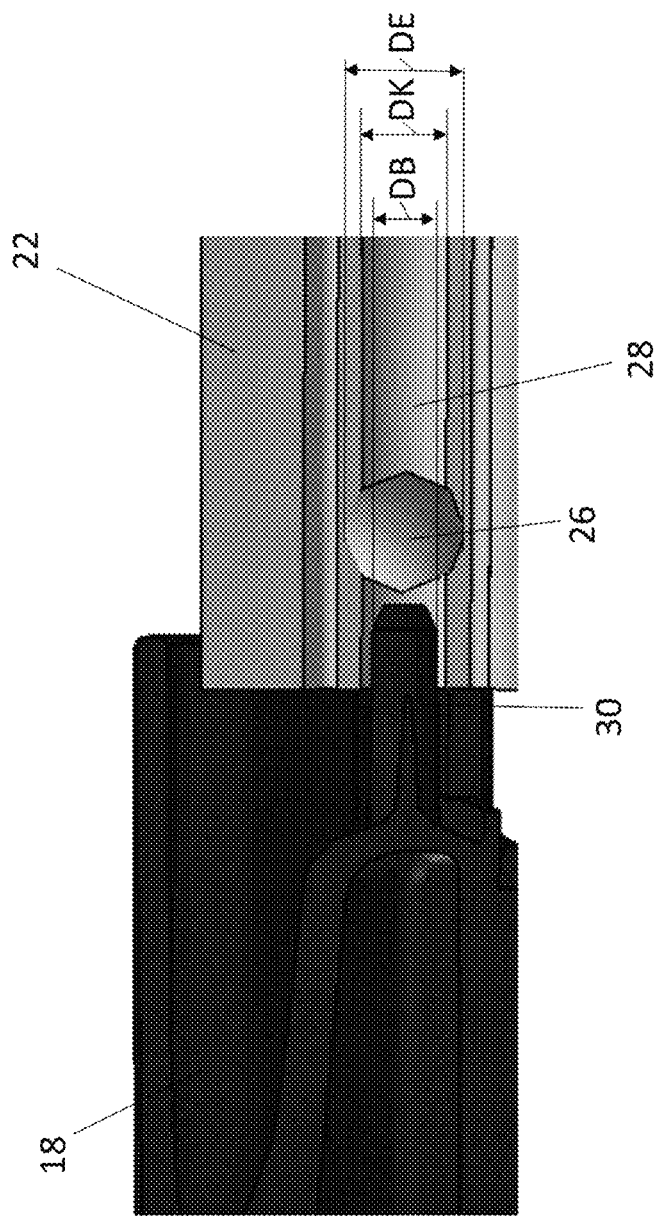

FIG. 4 is a partial sectional representation of the end of a wind deflector 22 and an end cap 18. The fluid channel 28 is arranged longitudinally in the wind deflector 22. The closure element 26 of which the diameter DE is slightly greater than the channel diameter DK is inserted in the fluid channel 28. At the end of the longitudinal extension of the wind deflector 22, the blocking plug 30 of the end cap 18 is inserted into the fluid channel 28. The blocking diameter DB, i.e., the diameter of the blocking plug 30, is slightly smaller than the channel diameter DK.

The end cap 18 is produced in one piece from plastics material in an injection molding process, but a multi-part embodiment is also possible. Thus, for example, the blocking plug 30 can also be inserted as a separate part into the end cap 18. In this case, the blocking plug 30 can also consist of a different material, for example metal.

The end cap 18 is designed to be nozzle-free, and therefore has no nozzles for dispensing cleaning liquid. The end cap 18 surrounds the wind deflector 22 here partially and its outer contour is adapted to the spoiler-like wind deflector 22. The fluid channel 28 can have, for example, a plurality of openings through which cleaning liquid exits in the direction of the wiper lip 20 or the pane to be wiped. The wind deflector 22 is produced from plastics material, in particular EPDM, in a multi-component extrusion process and has clamp-like portions 34 (FIG. 3) on which the spring bar 24 partially engages. In addition, a heating element can be provided in the wind deflector 22 and/or the wiper lip 20, which heating element is intended to heat the wiper strip 12.

The closure element 26, which, as already described, is in the form of a steel ball here, can also be in the form of a cylindrical bolt or a cone or truncated cone in a variation of the invention, which can have advantages depending on the production method. Instead of metal, the closure element 26 can also be made of plastics material, for example polyethylene or polypropylene.

What is claimed is:

1. A wiper blade (10) for a motor vehicle, comprising a wiper strip (12), a fluid channel (28), which has a channel diameter (DK), for conducting a cleaning liquid, and an end cap (18), characterized in that the end cap (18) has a main body and a blocking plug (30) extending from the main body and formed integrally as a single piece with main body, wherein the blocking plug includes a distal region configured to be inserted into the fluid channel, wherein the distal region has a blocking diameter (DB) which is smaller than the channel diameter (DK), such that a radial gap is configured to exist within the channel between the distal region and the channel diameter (DK) when the distal region is inserted into the fluid channel.

2. The wiper blade (10) according to claim 1, characterized in that a closure element (26) is provided in the fluid channel (28).

3. The wiper blade (10) according to claim 2, characterized in that the closure element (26) has a diameter (DE) which is greater than the channel diameter (DK).

4. The wiper blade (10) according to claim 2, characterized in that the closure element (26) is in the form of a ball.

5. The wiper blade (10) according to claim 4, wherein the closure element (26) is in the form of a steel ball.

6. The wiper blade (10) according to claim 2, wherein the closure element is axially spaced from the distal region of the blocking plug.

7. The wiper blade (10) according to claim 1, characterized in that the wiper strip (12) comprises a wiper lip (20) and a wind deflector (22) and the fluid channel (28) is arranged in the wind deflector (22).

8. The wiper blade (10) according to claim 1, characterized in that the wiper strip (12) comprises a spring bar (24) and the end cap (18) is fastened to the spring bar (24).

9. The wiper blade (10) according to claim 8, wherein the end cap (18) is fastened to the spring bar (24) by a latching connection.

10. The wiper blade (10) according to claim 1, characterized in that the end cap (18) is formed without nozzles.

11. The wiper blade (10) according to claim 1, wherein the distal region of the blocking plug includes a tapered distal tip, wherein tapered distal tip includes a diameter that decreases in size, from the blocking diameter (DB), moving distally along the tapered distal tip.

* * * * *